United States Patent [19]
Schiller

[11] Patent Number: 5,777,728
[45] Date of Patent: Jul. 7, 1998

[54] LIGHT METER

[75] Inventor: Richard Friedrich Schiller, Basingstoke, United Kingdom

[73] Assignees: Sony Corporation, Tokyo, Japan; Sony United Kingdom Limited, Weybridge, England

[21] Appl. No.: 745,857

[22] Filed: Nov. 8, 1996

[30] Foreign Application Priority Data

Nov. 10, 1995 [GB] United Kingdom ............... 9523055

[51] Int. Cl.$^6$ ........................................ C01J 1/42
[52] U.S. Cl. ........................... 356/222; 250/214 P
[58] Field of Search ........................... 356/222, 223, 356/218, 226; 250/214 P

[56] References Cited

U.S. PATENT DOCUMENTS 3,790,789  2/1974  Takahashi et al. ............ 250/214 P
4,476,383  10/1984  Fukuhara et al. ............. 250/214 P

*Primary Examiner*—K. Hantis
*Attorney, Agent, or Firm*—Frommer Lawrence & Haug LLP; William S. Frommer

[57] ABSTRACT

A light meter comprising: a light sensitive charge storage array having at least one charge storage cell, and reading circuit means connected to said array for generating a light reading from charge stored in said array, said light reading being indicative of the quantity of light incident on said array; wherein said reading circuit means collects charge from said array and compares said collected charge to a threshold to generate said light reading.

27 Claims, 12 Drawing Sheets

LIGHT METER

BACKGROUND OF THE INVENTION

1. Field of the Invention

This invention relates to light meters.

2. Description of the Prior Art

As anyone who has tried to take photographs without a flash will know, the quality of the resulting photograph depends, to a large degree, on the quantity of light that reaches the film. In general, two different quantities govern the amount of light that reaches the film; the shutter speed and the aperture area. Other parameters also come into play, but these will be ignored for the purposes of this brief review.

The shutter speed controls the amount of time for which the shutter opens and allows light to pass into the camera. Shutter speeds are usually quoted in fractions of a second and modern manual cameras, as opposed to "point and shoot" cameras, generally have a dial or other means showing shutter speeds of 1/30, 1/60, 1/100, 1/125, 1/250 and 1/500 of a second, where a smaller fraction indicates a faster shutter speed and hence a smaller amount of time for which light is allowed to reach the film.

Aperture area also varies the amount of light that is allowed to reach the film. Aperture areas are usually quoted as aperture stop areas ('f' numbers) and are measured on a logarithmic base two scale. For example, a change from f2 to f1.4 would involve a halving in aperture area. Similarly, a change from f1.4 to f4 would involve a fourfold increase in aperture area.

The quantity of light that is allowed to reach the film is related to both the aperture area and the shutter speed. The shutter speed is in turn related to the exposure time such that an increase in shutter speed (from 1/30 s to 1/60 s, say) corresponds to a reduction in exposure time. The quantity of incident light is typically measured in terms of Exposure Value (EV) measured on a standard scale and is related to the aperture area and exposure time by the following empirical equation;

$$\text{Quantity of Light} \propto \text{Intensity Aperture Area} \cdot \text{Exposure Time} \quad (1)$$

From equation 1, it may immediately be seen that for a given quantity of incident light, a range of valid aperture and exposure (shutter speed) settings exist. Hence, a doubling of aperture area requires a corresponding halving of the time for which the film is exposed to light—if the quantity of incident light is to be maintained.

Traditional light meters measure on a linear basis. That is to say, that a linear increase in the quantity of incident light causes a corresponding linear increase in sensing system output. That linear output is then converted to a logarithmic meter reading. Whilst such an arrangement is adequate, the internal conversion from a linear sensing system reading to a logarithmic output causes a number of inaccuracies in these prior art devices.

The other, more serious, deficiency of the prior art meters is that they can tend to be inaccurate at limits of their dynamic operating range. For example, it has been noted that a meter scale of approximately 40 stops would provide a system that would give adequate range for almost any exposure ever required. Forty stops, however, represents an exposure value range of around $10^{12}$ which would demand a very high performance from a conventional linear sensing system. Inevitably, some errors become apparent in such a linear device. Furthermore, additional inaccuracies in the log conversion of the linear sensing system reading would further limit the accuracy and effectiveness of the meter device.

Even if a more moderate range of 20 stops were to be adopted, this would still represent an exposure value range of $10^6$—which would still cause conversion and sensing errors in a linear device.

In summary, Prior Art meters suffer from the disadvantages that their sensing systems operate in a linear fashion, and that the linear output signals therefrom must then be converted to a logarithmic signal. This conversion of a linear signal to a logarithmic signal can lead to accuracy errors in the logarithmic output. In addition, linear sensing systems suffer from the disadvantage that it is difficult to provide a meter that is accurate across its entire dynamic range. Traditional meters typically exhibit accuracy problems at extremes of their dynamic range.

SUMMARY OF THE INVENTION

It is an object of the present invention to provide an improved light meter that alleviates the abovementioned problems.

In accordance with the present invention, there is provided a light meter comprising: a light sensitive charge storage array having at least one charge storage cell, and reading circuit means connected to said array for generating a light reading from charge stored in said array, said light reading being indicative of the quantity of light incident on said array; wherein said reading circuit means collects charge from said array and compares said collected charge to a threshold to generate said light reading.

In one embodiment, the array comprises a plurality of charge storage cells. In which case, each of said cells may have a substantially identical area that is exposed to incident light.

In another aspect, the reading circuit means conducts an iterative process in which charge is read from groups of cells at each iteration. In which case, respective groups of cells read by said reading circuit means may comprise an exponentially increasing number of cells.

In yet another aspect, the light reading I is calculated by a logic unit according to the equation:

$$I = k \cdot \frac{V_{threshold}}{B}$$

where k is a constant, $V_{threshold}$ is said threshold, and B is the number of iterations performed.

In another embodiment, the charge may be read sequentially from each cell of the array. In which case, it is preferred that the reading circuit means conducts an iterative process, one of the cells being read at each iteration.

In another embodiment, the reading circuit means sums at each iteration the charge read from said cells and compares said summed charge to said threshold. Alternatively, the charge stored in each cell of the array may be individually compared to said threshold.

In another embodiment, each cell of the array is provided in isolation from neighbouring cells and outputs charge to respective ones of a plurality of reading circuit means. In which case each of said reading circuit means may be connected to a logic unit for ascertaining a first cell in said array at which said threshold is exceeded. The logic unit may be a positional coder which, in use, determines a first of said cells at which said threshold is exceeded.

In another embodiment, respective cells of said array may have an area that increases in an exponential progression. In which case, each cell of the array may have an exposed area that increases in an exponential progression by virtue of a mask placed over said array. Alternatively, each cell of the array may be exposed to varying quantities of incident light by virtue of a graduated filter placed over said array.

In another embodiment, the array comprises a plurality of masked read-out cells, each of said read out cells being connected to individual isolated storage cells, each of said read-out cells having a substantially identical area equal to a largest of said storage cells.

In another embodiment, the light reading I may be calculated by a logic unit according to the equation:

$$I = k \cdot \frac{V_{threshold}}{N}$$

where k is a constant, $V_{threshold}$ is said threshold, and N is the number of cells read.

In other embodiments, the light meter may comprise means for obtaining said light reading from a look-up table based upon the number of cells read. The means may additionally obtain the number of cells to be read at any iteration from a second look-up table. In which case, the look-up tables may be stored in read only memory (ROM).

In all of the above embodiments, the array preferably comprises at least one charge coupled device (CCD) cell.

Similarly, the reading circuit means preferably comprises: a switch for resetting said reading circuit means, a voltage supply for providing said threshold, a capacitor for storing charge from said array, and a comparator for comparing said charge to said threshold.

In another embodiment, the reading circuit means conducts an iterative process and said array is exposed to light for a predetermined amount of time T1 at each iteration. In which case, the predetermined exposure time T1 may be increased or decreased exponentially at respective iterations. Alternatively, the array may be exposed for a predetermined amount of time T1 at a first iteration and for constantly decreasing or increasing amounts of time at successive iterations. As a second alternative, each cell of the array may be exposed for a different amount of time.

In another embodiment, the array comprises: a first array of cells having respective areas that increase exponentially, and a second array of cells having respective areas that increase in a progression, said second array being comprised of a smaller number of cells than said first array, a first and a last cell of said second array each being substantially identical in exposed area to a pair of cells in said first array; wherein, in use, said first array is exposed for a time T1 to obtain an approximate point in said array at which said reading is generated and said second array is exposed for a different period of time T2 such that said second array is mapped onto said first array thereby to more accurately obtain said reading.

In a first aspect of this embodiment, the first array of cells have respective areas that increase in a log base 2 progression and the second array of cells have respective areas that increase in a log base 1.0728 progression.

In another embodiment, the array may comprise a single cell, said cell being repeatedly exposed in an iterative process for a period of time T1, said stored charge being read and summed by said reading circuit means at successive iterations to generate said reading. At each iteration, respective exposure times T1 may increase or decrease in an exponential progression.

The present invention also provides a camera wherein said exposure time T1 is user determined and chosen by way of the camera.

The present invention also provides a method of measuring the quantity of ambient light, the method comprising the steps of: exposing a light sensitive charge storage array having at least one charge storage cell to said ambient light, and generating a light reading from charge stored in said array by way of reading circuit means, wherein said reading circuit means collects charge from said at least one cell and compares said charge to a threshold to generate said light reading.

It will be apparent to the man skilled in the art that the light meter for use with the abovementioned method may include any of the features mentioned herein.

Embodiments of the present invention may alleviate the problems associated with the prior art by providing a meter and sensing system of improved accuracy and sensitivity that may also output a logarithmic signal thereby negating the need for any logarithmic conversion means.

In addition, the meter according to the present invention is easier and less expensive to manufacture and may also be of a small physical size. In one embodiment, the light sensitive part of the meter, which may be a Charge Coupled Device (CCD) array, may be manufactured on a single silicon chip.

Furthermore, that CCD array may be a chip that was originally designed for an alternative application but which falls below necessary quality standards. For example, reject CCD arrays originally manufactured for use in CCD cameras may be utilised in the present invention. These reject arrays typically contain a number of non-functioning cells which render them useless for a CCD camera. However, for the instant invention, a few non-functioning cells will probably not adversely affect the operation of the device to a discernable degree. As the instant invention utilises these reject chips, the manufacturing cost of the instant invention may be significantly reduced.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

As mentioned above, it is preferred that the light meter incorporates a CCD array as its light sensitive medium. In this connection, it is appropriate to discuss in a few paragraphs, the operation of a typical CCD. However, it should be noted, that whilst a CCD array is highly preferred, other light collection and storage means may be utilised for the light sensitive medium of the present invention, if desired.

Figure 1A:
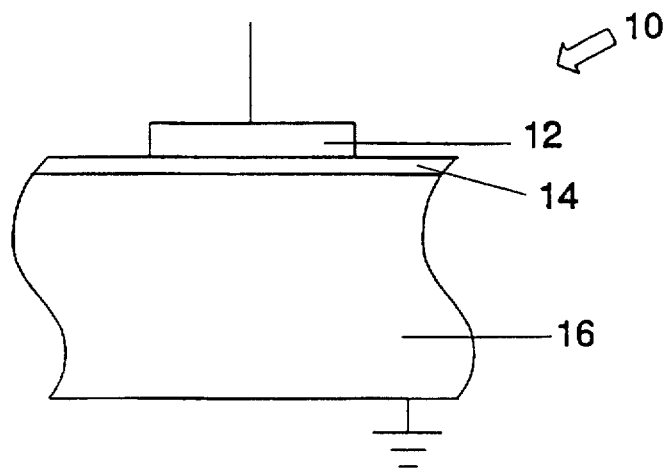
FIGS. 1a to 1d show a schematic representation of a single light collecting cell.

With reference to FIG. 1a, a single charge collection cell 10 of a CCD is shown. Typically, a CCD cell 10 comprises an electrode 12, an oxide insulating layer 14 and a substrate 16. The substrate typically comprises a P-type silicon semiconductor. Many other semiconductor materials are usable, but silicon is the most commonplace and hence the least expensive material. In an initial state, with voltage V=0, there will be an even distribution of holes in the substrate 16. As the substrate is of P-type silicon, the holes are the majority charge carriers.

Figure 1B:
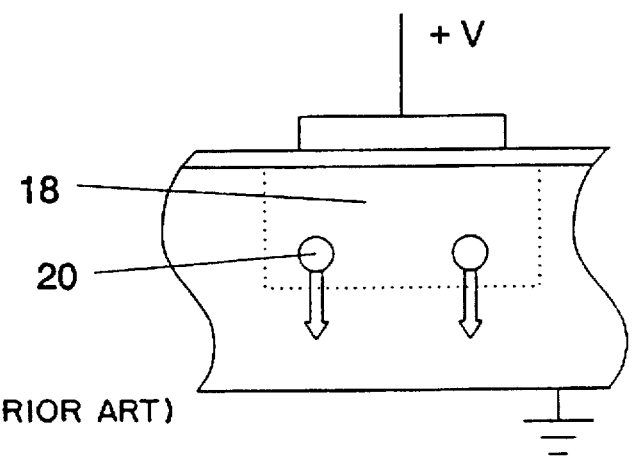

As shown in FIG. 1b, when the voltage V is increased, typically to around 10 volts, the holes 20 are repelled by the positive voltage V and driven further into the substrate 16. Movement of the holes 20 causes the formation of a depletion layer 18 below the electrode 12. The potential within the depletion layer 18 is highest at the electrode 12 and decreases with depth.

Figure 1C:
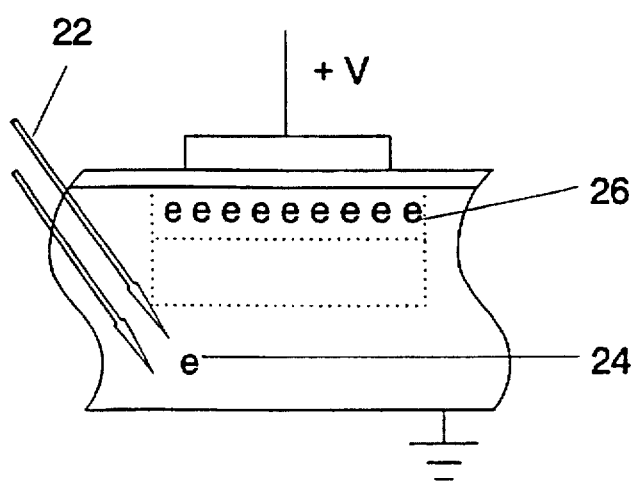

When the device is exposed to light, as shown in FIG. 1c, incident photons 22 cause generation of hole-electron pairs. This process is linear, i.e. doubling the quantity of light incident on the device or the exposure time causes a corresponding doubling in the number of charge carriers produced in the device. Photogenerated electrons 24 are attracted to the depletion layer 18 by the positive electrode 12. This gathering of electrons 24 causes the formation of an inversion layer 26 which is dominated by the minority carriers—i.e. the electrons 24. The quantity of electrons 24 held below the electrode 12 provides a direct quantification of the number of incident photons 22 and hence the quantity of incident light.

These CCD cells may also be used as charge storage devices by ensuring that the array is not exposed to light. An embodiment discussed below uses such an architecture.

Figure 2:
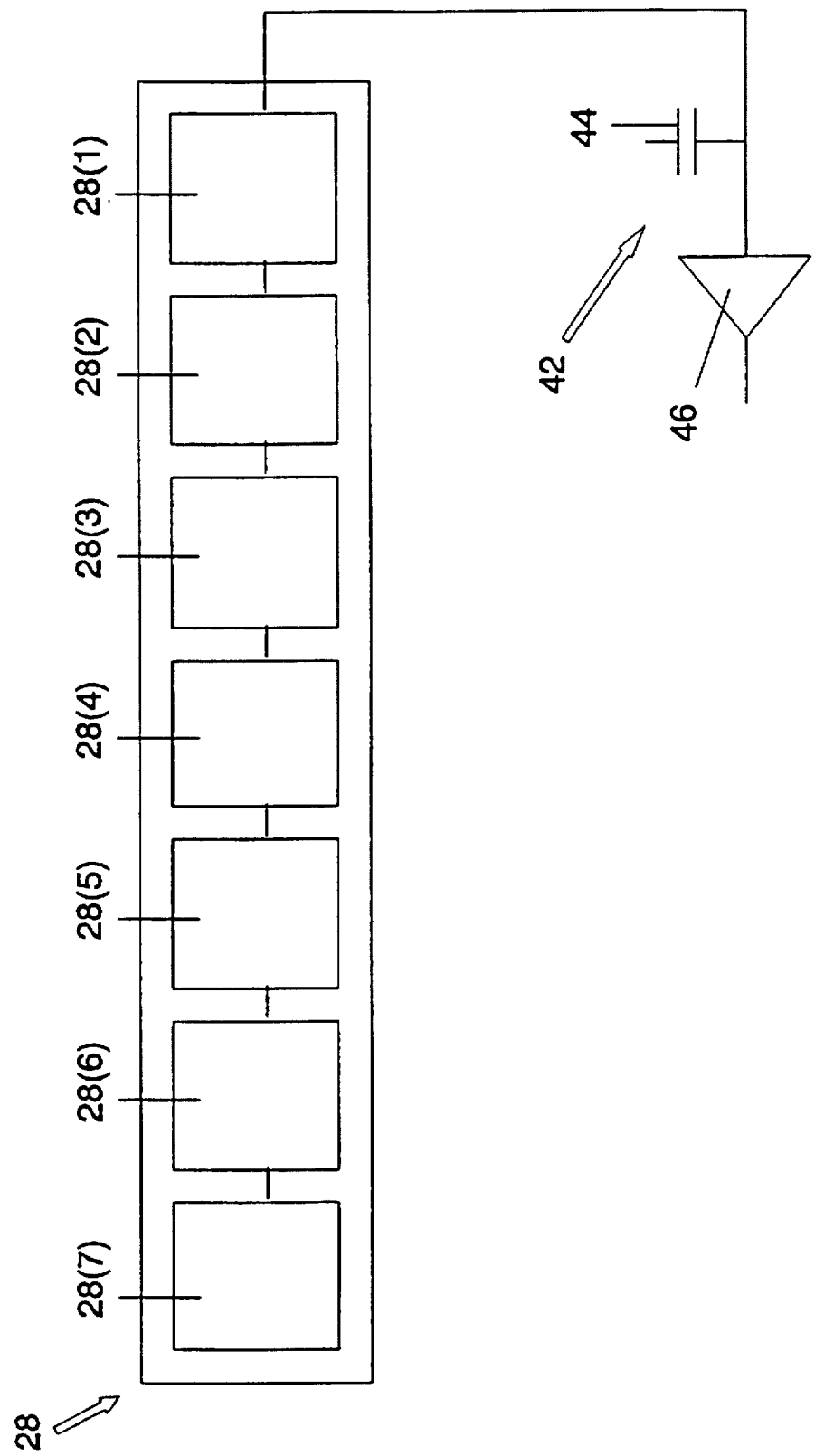
FIG. 2 shows a schematic representation of a light meter according to a first embodiment of the present invention.

A plurality of such CCD cells 10 are normally connected together in series to form an array 28—as illustrated in FIG. 2. By applying a periodically varying clock signal to the array, it is possible to charge couple the individual cells 10 of the array 28 and transfer charges along the array 28. By connecting suitable reading means; an example of which will be described later; to the array 28 a quantification of light incident on the array 28 may be made.

Figure 1D:
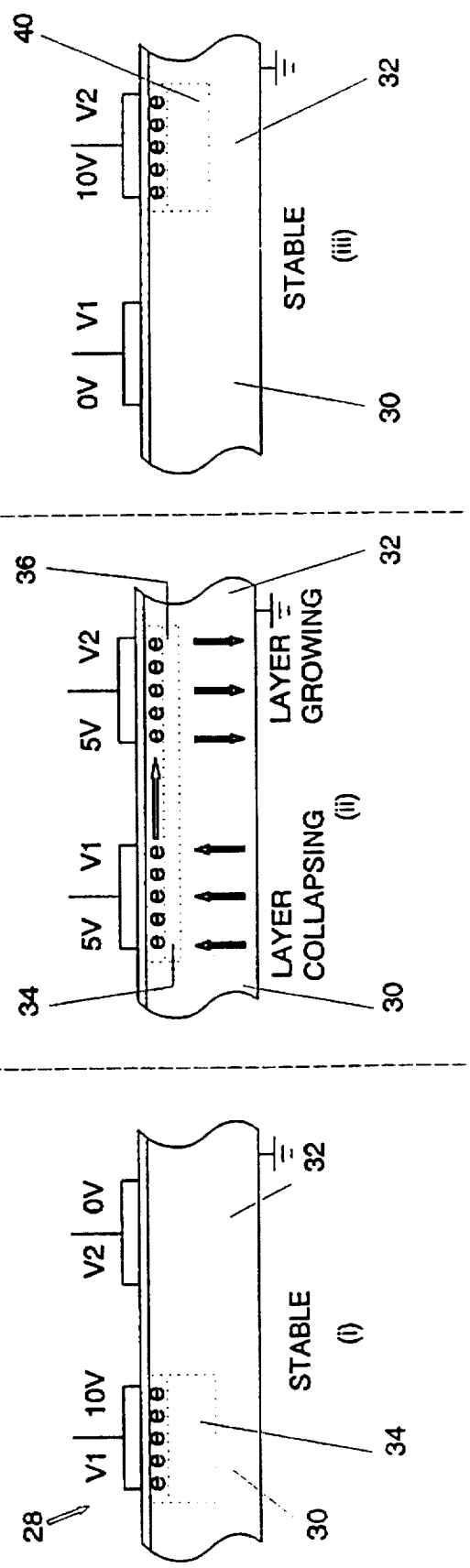

For example, as shown in FIG. 1d (i), Voltage V1 on cell 30 may initially be set to 10 volts. At this stage, cell 30 adopts a state similar to the stable state illustrated in FIG. 1c. Cell 32, at voltage V2, is also at a stable state similar to that illustrated in FIG. 1a. As voltage V1 decreases and voltage V2 increases, the depletion layer 34 in cell 30 decreases in depth whilst a depletion layer 36 in cell 32 begins to increase in depth. FIG. 1d (ii) illustrates a midpoint of such a cycle.

As the depletion layer 34 in cell 30 decreases, electrons from that depletion layer 34 are attracted to the increasing depletion layer 36. FIG. 1d (iii) illustrates a final point in this charge transfer cycle where a full depletion layer 40 has been created in cell 32 whilst the depletion layer 34 in cell 30 has decayed. The electrons originally held in cell 30 have therefore all been transferred to cell 32. In this way, charges due to incident protons that have accumulated in the array 28 may be passed to an end of the array 28 for sensing and counting. Thus, it is apparent that a measurement of the quantity of incident light may be made.

It should be noted that the application of a varying clock signal to the array is not the only way to generate an output. Other methods such as "two phase" CCD reading and "single phase" CCD reading, or indeed any other method, may equally well be adopted. Indeed, with regard to the instant device, it is preferred that the array is driven as a "single phase" CCD array. In this way, the varying applied voltage may also serve as an electronic shutter when the collection of charge by the array is not required.

With reference to FIG. 2, a first embodiment of the present device will now be described.

The first embodiment of the present device comprises a CCD array 28 connected to a reading circuit means 42. For reasons of simplicity, the reading circuit 42 has only been schematically shown in this Figure. The reading circuit 42 will be described in greater detail below.

The CCD array 28 comprises a plurality of CCD cells 10—which may be similar to those illustrated in FIGS. 1a to 1d—connected in series, although other equivalent arrangements will also be apparent. The reading circuit comprises a capacitor 44 and a comparator 46 amongst other components.

The CCD array 28 is placed under a diffuser (not shown) so that each cell 10 of the array 28 is exposed to a similar quantity of ambient light. The array 28 accumulates charge for a pre-determined length of time and then shutter means (not shown) are operated to prevent further accumulation of charge. The shutter means may comprise a mechanical shutter provided over the array or more preferably, it may comprise an electronic shutter, the likes of which are common in the art and will not be further described herein. The array 28 is then driven to pass the charge from a first cell 28(1) of the array to the capacitor 44. Any voltage (equivalent to the amount of charge) stored in the capacitor 44 is then compared to a threshold voltage $V_{threshold}$ by the comparator 46 and if the capacitor voltage is greater than $V_{threshold}$, then an "over" reading is outputted and a meter reading is generated.

If, however, the threshold voltage $V_{threshold}$ is not exceeded, then any charge from a second cell 28(2) is transferred to the capacitor 44 and added to the charge from the first cell 28(1). Once again, the capacitor voltage is then compared to the threshold voltage $V_{threshold}$. As above, if the threshold is exceeded, an "over" reading is generated; otherwise the process is repeated by reading and summing subsequent cell voltages.

If, after all of the array cells have been read and summed the capacitor voltage is still beneath the threshold voltage, then a "low light level" signal is generated.

The threshold voltage $V_{threshold}$ is an arbitrary value which is preferably chosen to be a substantial percentage of the maximum charge storable by a cell of the array. In this way, the threshold voltage $V_{threshold}$ also acts as a filter to remove any spurious signals from the cells 10 of the array 28 which may be attributable to noise.

The reading circuit means 42 includes timing means (not shown) which provides a signal to the array 28, which may be similar to that shown in FIG. 1d. The timing circuit also incorporates a counter which counts the number of pulses supplied to the array 28. A plurality of other drive signal patterns may, of course, be selected.

As described with reference to FIGS. 1a to 1d, each cell stores a quantity of charge that is linearly representative of the quantity of light incident on that cell. The charge stored in each cell in turn may be expressed as a voltage $V_a$, where "a" is the number of the cell. In this embodiment, $V_a$ is roughly constant throughout the array. However, later embodiments will show that this need not be so.

In this connection, we may write that the total voltage $V_{total}$ stored by the array 28 is the sum of the individual voltages stored by each cell of the array, i.e.

$$V_{total} = \sum_{a=1}^{n} V_a \tag{4}$$

where n equals the number of cells in the array 28.

As mentioned above, successive cell voltages $V_a$ are added to the capacitor voltage $V_{capacitor}$ in an iterative process. That iterative process ceases when $V_{capacitor}$ first exceeds a threshold voltage $V_{threshold}$. At that point, $V_{capacitor}$ is approximately equal to $V_{threshold}$ and may be quoted as;

$$V_{capacitor} \approx \sum_{a=1}^{N} V_a \tag{5}$$

where N is less than n and represents the number of the cell immediately after the threshold voltage $V_{threshold}$ is exceeded.

At the threshold, when a=N, the capacitor voltage $V_{capacitor}$ is approximately equal to the threshold voltage $V_{threshold}$ and thus we may write;

$$V_{threshold} \approx \sum_{a=1}^{N} V_a \tag{6}$$

Furthermore, we know that each cell stores a quantity of charge that is linearly related to the quantity of ambient light incident on that cell. Thus, it may be written that the division of the threshold voltage $V_{threshold}$ by N gives a voltage reading indicating the quantity of light incident on the array (as $V_a$ is directly linearly proportional to the quantity of incident ambient light). Thus, we may write;

$$I_{ambient} \propto \frac{\sum_{a=1}^{N} V_a}{N} = \frac{V_{threshold}}{N} \tag{7}$$

and thus that;

$$I_{ambient} = k \cdot \frac{V_{threshold}}{N} \tag{8}$$

where $I_{ambient}$ is the quantity of ambient light, and k is a constant.

$I_{ambient}$ is the quantity which the meter is designed to measure. As the threshold $V_{threshold}$ is preset and thus known, the numerator of equation 7 is known. In addition, the timing circuit counter maintains a record of the number of pulses supplied to the array 28, and as one pulse is supplied for each cell, N is also known. Given the above, a simple logic unit may be employed to calculate the quantity of incident ambient light.

Alternatively, the reading circuit means could simply be connected to a "lookup" table stored, for example, in Read Only Memory (ROM). In this way, the comparator 46 would output a signal when "x" cells have been read and summed. Logic means, in receipt of a signal that "x" cells have been read to exceed the threshold, would then be able to read off the quantity of ambient light (or logarithmic aperture stop area) purely from the number of cells read and/or summed.

As mentioned above, this first embodiment of the present device may be worked with a simple logic unit which calculates the quantity of incident light based upon equation 8 given above. In which case, this embodiment would generate a linear output in light intensity units, and thus further logarithmic "look-up" tables or a logarithmic conversion logic unit may be needed if it was desired to generate logarithmic aperture stop readings.

Even though this embodiment of the present device is not designed to generate logarithmic readings, it still offers significant improvements over the prior art. Firstly, the present device enables the manufacture of relatively inexpensive light meters as the light sensitive portion of the device may be manufactured from a single, possibly reject, silicon chip by a number of conventional processes. Secondly, the present technique provides for a potentially accurate meter that may alleviate problems associated with the prior art devices.

Clearly, as the individual cells of the array are reduced in size and hence charge carrying capacity, they each represent a smaller fraction of the threshold voltage. In this way, a very large number of physically small cells could be used to provide a meter having an increased resolution.

For reasons discussed above, it is apparent, however, that it would be highly preferable if the device outputted a logarithmic signal. In this way, logarithmic "look up" tables and logarithmic conversion logic units could be dispensed with.

The above described first embodiment may, however, be easily adapted in a second embodiment of the present device to enable the production of such a logarithmic output signal.

We have mentioned above that the array 28 is driven by a pulsed signal, the number of pulses being equal to the number of CCD cells that must be read and summed before the threshold is exceeded. If the pulses were generated in an exponential progression, however, then the reading circuit means would be able to generate a logarithmic output by reading an exponentially increasing number of individual cells from the array. Such an arrangement is illustrated in FIG. 3.

Figure 3:
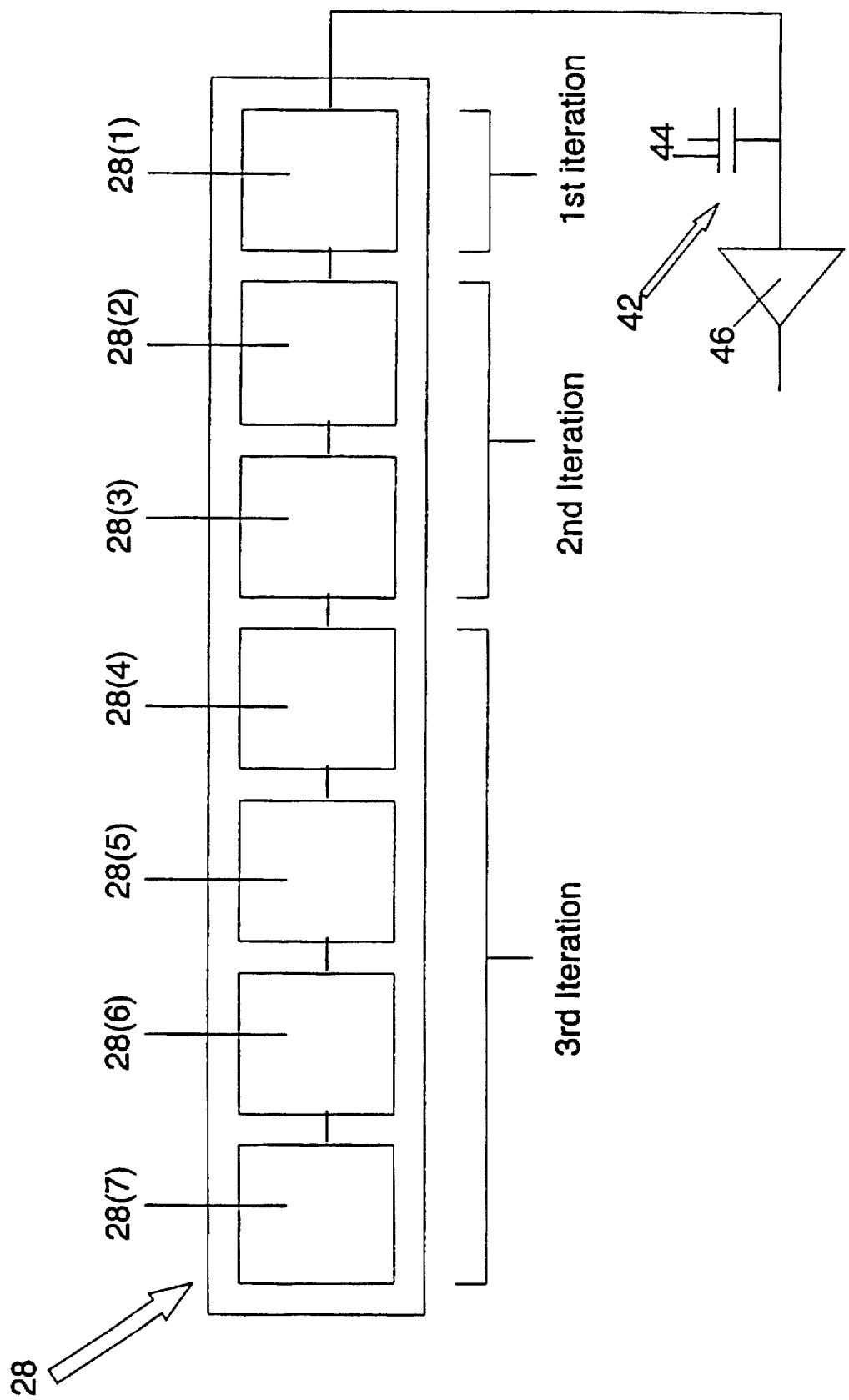
FIG. 3 shows a schematic representation of a light meter according to a second embodiment of the present invention.

With reference to FIG. 3, the array 28 is shown as having seven individual cells indexed 28(1) to 28(7). It should be noted, that all the Figures are purely exemplary and that a practical light meter would probably comprise a vastly higher number of individual cells (However, it is conceivable that a workable light meter could be constructed using a single CCD cell—such an arrangement is described later below).

In a similar manner to that described above, the reading circuit means 42 at a first iteration reads the voltage stored in cell 28(1) into the capacitor. The voltage resident in the capacitor 44 is then compared to the threshold voltage in the manner described above. If the capacitor voltage does not exceed the threshold, then, rather than reading only the next cell, the reading circuit means reads the following two cells 28(2) and 28(3). The sum of cells 28(1,2,3) stored in the capacitor is then compared to the threshold voltage. If the threshold is not exceeded, then the voltages stored in the next four cells are read into the capacitor. This pattern continues in an exponentially increasing fashion.

Of course, with reference to FIG. 3, emptying of individual cells would cause the charges from following cells to be transferred to the right hand side of the Figure. In this way, when cell 28(1) is emptied, the voltage stored in cell 28(2) is transferred to the now empty cell 28(1) and cell 28(2) effectively becomes cell 28(1).

In a manner similar to that described above, each cell 28(1) to 28(7) stores a voltage $V_0$ which is approximately constant throughout the array of the present embodiment. Thus, we may still write that:

$$V_{total} = \sum_{a=1}^{n} V_a \equiv nV_a \tag{9}$$

where n=the total number of cells in the array.

However, in distinction to the first embodiment described above, the reading circuit means at each iteration "b" reads an exponentially increased number of cells. In this case, the number of cells read at each iteration increases on log base 2 scale.

Thus, in this case we can write that, at the b'th iteration, the reading circuit means reads and sums $2^{(b-1)}$ cells, where b varies from 1 to B, where B is the number of iterations before the threshold is exceeded. From the above, it is apparent that a log base three scale may be utilised by summing $3^{(b-1)}$ cells from b=1 to b=B where B is the number of iterations needed to exceed the threshold voltage. Other exponential scales may be utilised by using different factors.

For the present log base 2 example, we can write that the quantity of ambient light is;

$$I_{ambient} \propto \frac{\sum_{b=1}^{B} 2^{(b-1)} V_0}{B} = \frac{V_{threshold}}{B} \tag{10}$$

and thus that;

$$I_{ambient} = k \cdot \frac{V_{threshold}}{B} \tag{11}$$

where

B equals the number of iterations needed before the threshold is exceeded, and;

k is a constant.

Equation 11 may be calculated by a simple logic unit, or, more preferably, a "look-up" table will be stored in ROM, for example, and the device will be able to look-up the quantity of ambient light upon receipt of a signal indicating the number of cells read or summed. The light reading, in this case, may be a logarithmic reading measured in aperture stops.

Figure 4:
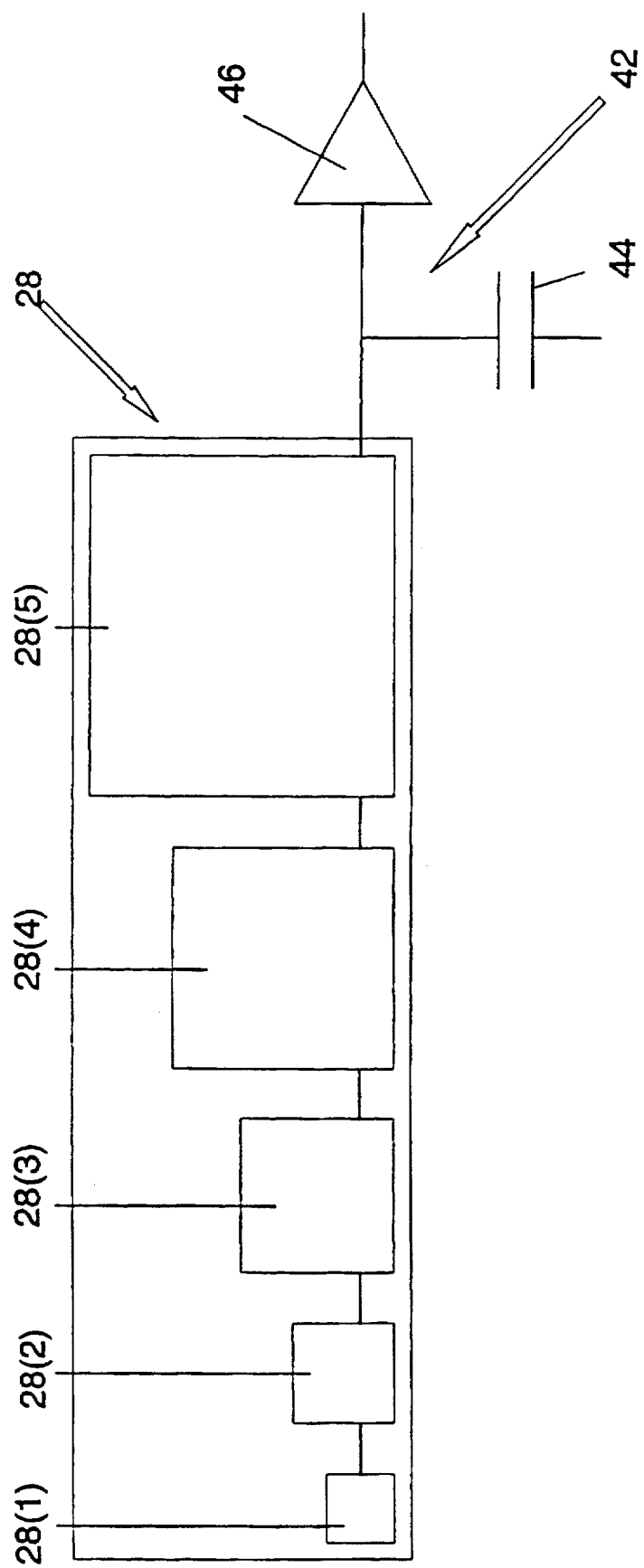
FIG. 4 shows a schematic representation of a light meter according to a third embodiment of the present invention.

A third embodiment of the present technique is illustrated in FIG. 4. In this embodiment, the array 28 comprises a plurality of individual cells 28(1) to 28(5), each of a different area. Each cell of the array has an area which is exponentially increased with respect to the area of an immediately adjacent cell. That is to say that the first cell 28(1) has an area of one unit, the second 28(2) an area of two units, the third 28(3) an area of four units and so on. Other exponential progressions may be adopted if preferred.

In this embodiment, however, in contradistinction to the foregoing embodiments, it is preferred that the cells 28(1) to 28(5) of the array 28 are arranged in such a fashion that measurements are taken from the largest cell 28(5) first. This architecture is adopted to ensure that charges passed down the array do not "overfill" any cell of the array. In addition, the larger cells will also be subject to greater leakage loss of charge to adjacent cells than the smaller cells and thus it is preferred to empty the largest cells first. A suitable array architecture is shown in FIG. 4.

In this embodiment, we may write that the voltage stored by any cell is a function of its area, and thus that:

$$V_a = V_0 A_a \tag{12}$$

where $V_a$ is the voltage stored by the a'th cell, $V_0$ is the voltage stored by a cell of unit area for a unit amount of light, n is the total number of cells in the array, and $A_a$ is the area of the a'th cell read, where $A_a = 2^{(n-a)}$ (Note that in this embodiment, the largest cell is read first hence, for cell 28(5), a=1).

Thus, we may write that the total voltage stored by the array $V_{total}$ is:

$$V_{total} = \sum_{a=1}^{n} V_0 A_a \tag{13}$$

At the threshold, we may write that:

$$V_{threshold} = \sum_{a=1}^{N} V_0 A_a \tag{14}$$

where N=the number of cells that must be read before the threshold is exceeded.

Thus, from equations 12 and 13 we may write that the quantity of ambient light $I_{ambient}$ is:

$$I_{ambient} = k \cdot \frac{V_{threshold}}{N} = \frac{\sum_{a=1}^{N} V_0 A_a}{N} = \frac{\sum_{a=1}^{N} V_0 2^{(n-a)}}{N} \tag{15}$$

where k is a constant.

As with the other embodiments discussed above the quantity of ambient light may be calculated from equation 15 by suitable logic means. However, it is highly preferred that the quantity of incident ambient light is read from a look-up table stored in ROM, for example. In this way, a reading related to the quantity of incident ambient light may be obtained purely from the number of cells read, for example.

Figure 5:
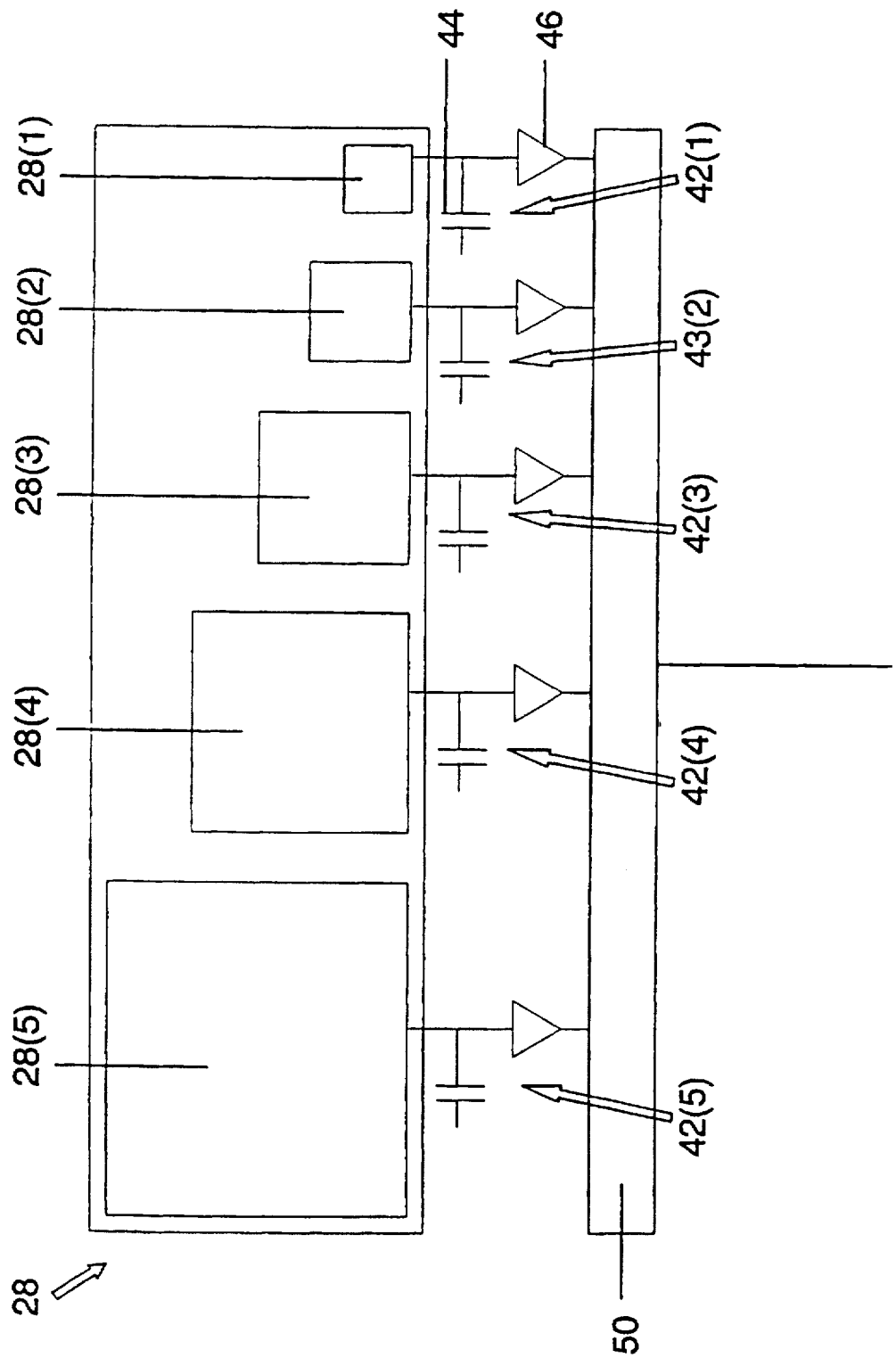
FIG. 5 shows a schematic representation of a light meter according to a fourth embodiment of the present invention.

As an alternative to the architecture of the above mentioned third embodiment, the cells of the array may each be read individually. In this fourth embodiment, each cell is connected to a capacitor 44, comparator 46 and threshold voltage means (not shown) as shown in FIG. 5. Each comparator outputs to a positional coder 50. The positional coder 50 identifies which of the cell outputs exceed the voltage threshold and stores the number of the cell at which the threshold $V_{threshold}$ is first exceeded.

For example, if the charge stored in cells 28(4) and 28(5) each exceed the threshold, then the positional coder 50 will record that the fourth cell 28(4) was the first cell at which the threshold was exceeded. The quantity of incident light reading may then be obtained from "look-up" table stored in ROM, for example.

At first sight, this embodiment would seem to be at a disadvantage to the earlier embodiments as it necessitates a replication of the reading circuits 42(1) to 42(5) which are individually connected to each cell 28(1) to 28(5) of the array 28. However, upon closer inspection, it is apparent that due to the exponential increase in area, only a small number of reading circuits will be needed to provide a meter of increased accuracy. For example, a 20 stop range, ½ stop accuracy meter with overload indication would only require 42 individual reading circuits. This embodiment would, however, be substantially faster in operation than previous embodiments as no summing of individual cell voltages is required i.e. a meter reading may be generated without having to undergo successive iterations.

Figure 6:
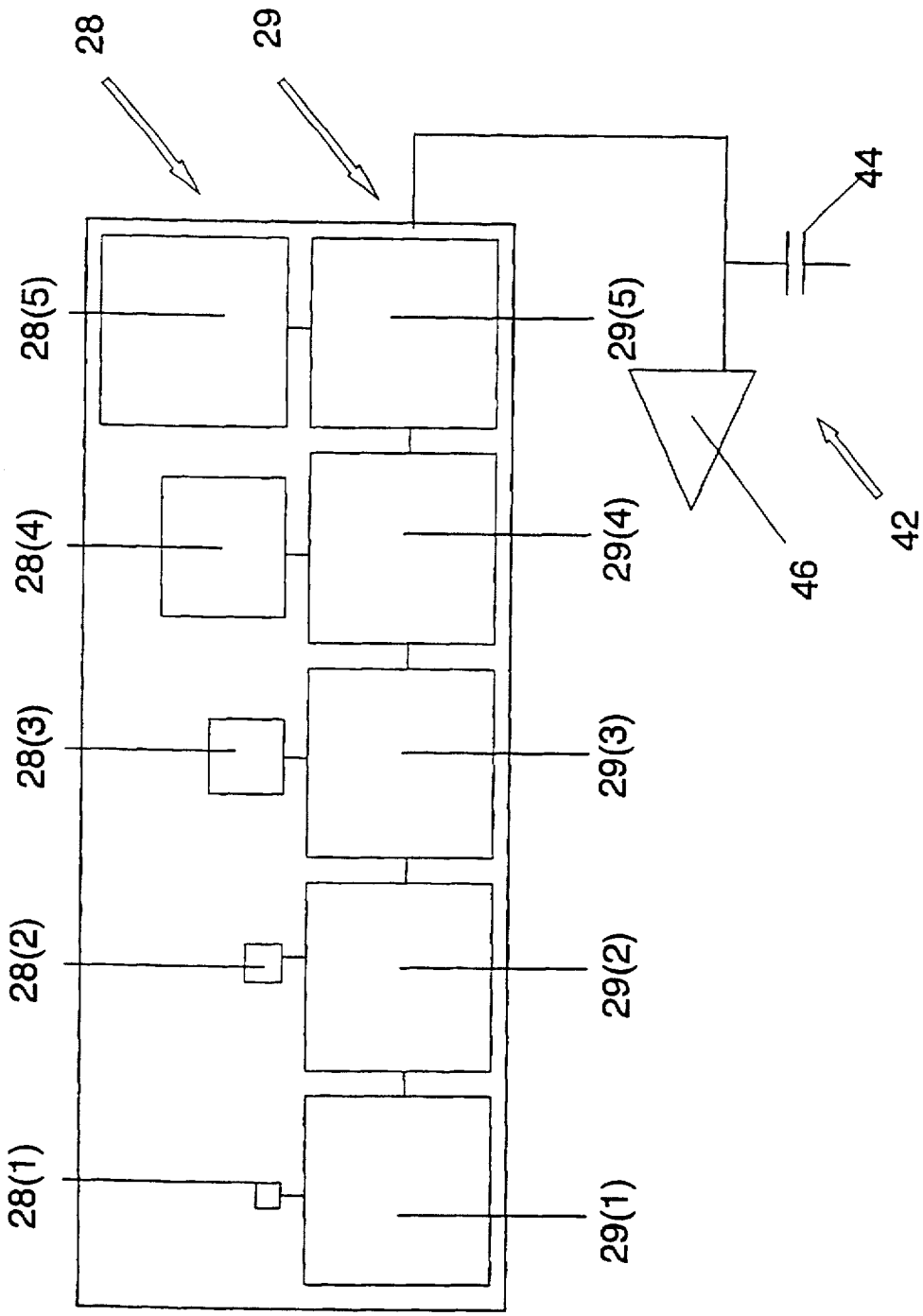
FIG. 6 shows a schematic representation of a light meter according to a fifth embodiment of the present invention.

FIG. 6 illustrates a fifth embodiment of the present device. In this fifth embodiment, the CCD array 28 includes a separate read-out register 29. The read-out register 29 is linked in an array and each cell 29(1) to 29(5) thereof is joined to an individual reading cell 28(1) to 28(5). As in embodiments 3 and 4 (FIGS. 4 and 5), the reading cells 28(1) to 28(5) are of logarithmically increasing size.

The cells 29(1) to 29(5) of the read-out register 29 must be large enough to accept the charge from the largest reading cell 28(5). That is to say, that each cell of the read-out register 29 is preferably the same size as the largest reading cell 28(5). Furthermore, the read-out register 29 is preferably masked so as to prevent charge accumulation in the register due to light falling on the register. In this way, it is apparent that the charge stored in the register cells is, to a large extent, equivalent to the amount of charge stored in the corresponding reading cells.

As with embodiment 3, it is once again preferred that the array is arranged such that the largest reading cells are emptied first. Such an architecture minimizes charge leakage between adjacent cells. It will be apparent, though, that the array could be re-arranged, as in Embodiment 6 for example, to empty the smallest cell first —but the charge stored by the larger cells may leak to adjoining cells and the accuracy of the device may suffer. It will be remembered, of course, that the Embodiment 3 array is non-reversible due to the possibility of overfilling smaller cells in the array.

As with the third embodiment, we may write that:

$$V_{total} = \sum_{a=1}^{n} V_0 A_a \quad (16)$$

where $V_0$ is the voltage stored by a cell of unit area exposed to a unit quantity of light, n is the total number of cells in the array, and $A_a$ is the area of the a'th cell, where $A_a=2^{(n-a)}$ (Note that as the largest cell 28(5) is read first, so a=1 for cell 28(5).

Thus, it is apparent that equation 15 is still valid and may thus be used by logic means to calculate the quantity of incident light, if required.

Alternatively, it is highly preferred that a look-up table stored in ROM, for example, is utilised to ascertain the quantity of incident light. In this way, the reading circuit 42 sums successive cell charges until the threshold is reached. At the threshold, the number of cells read is known and thus, the quantity of incident light may be looked-up based solely upon the number of cells read.

Figure 7:
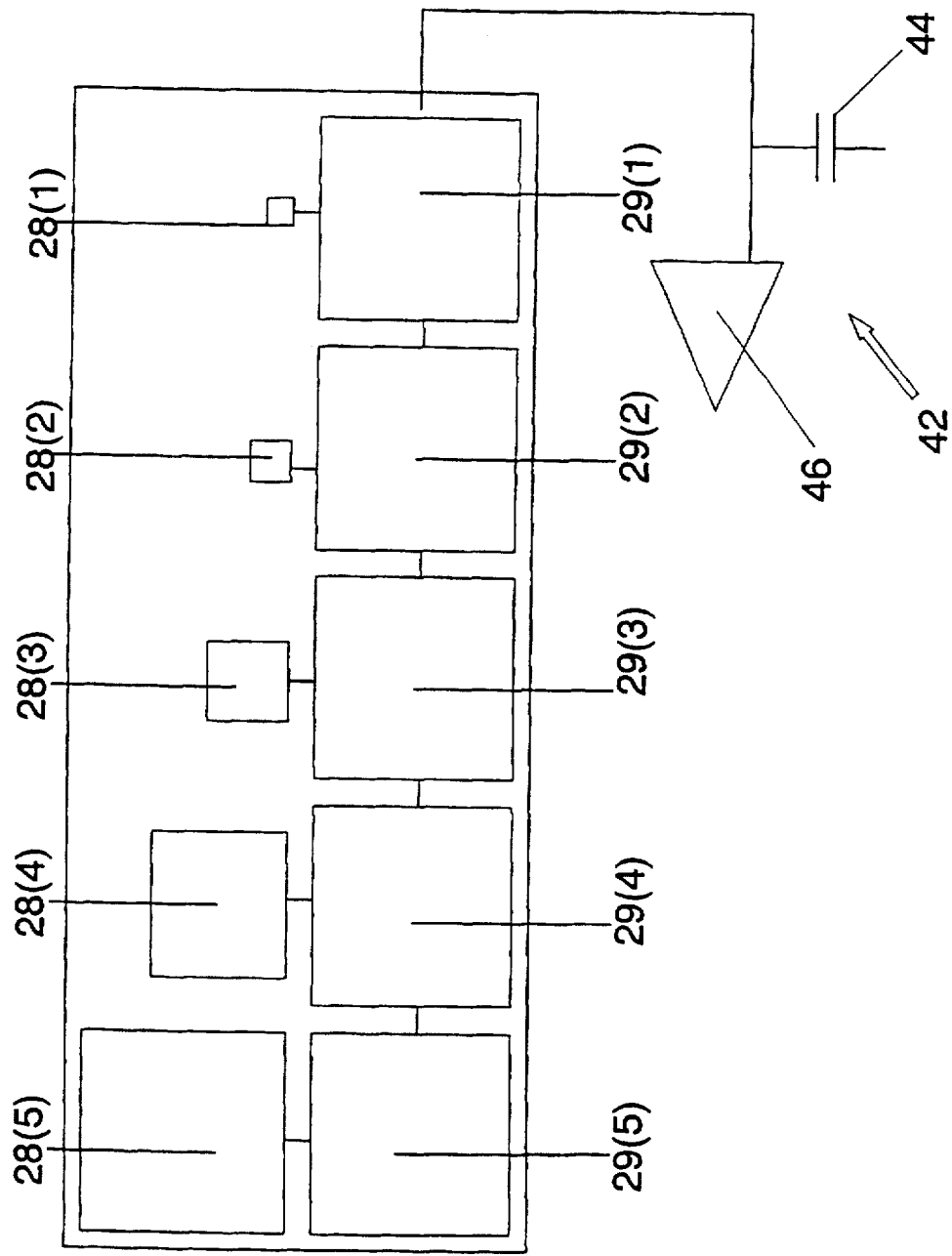
FIG. 7 shows a schematic representation of a light meter according to a sixth embodiment of the present invention.

The sixth embodiment, as illustrated in FIG. 7, is identical in architecture to that of the fifth embodiment other than that the array 28 is reversed. In the sixth embodiment, the charge from the smallest cell is read first.

In the sixth embodiment, equations 15 and 16 with minor amendment still hold true, but the equation for the area of the cell must be amended as the first cell read, where a=1, has the smallest area. Thus we may write that:

$$A_a(\text{embodiment 6}) = 2^{(a-1)} \quad (17)$$

in which case $$I_{ambient} = k \cdot \frac{V_{threshold}}{N} = \frac{\sum_{a=1}^{N} V_0 2^{(a-1)}}{N} \quad (18)$$

where k is a constant.

Once again, as described in detail above, equation 18 may be calculated by suitable logic means, but it is highly preferred that a look-up table stored in ROM is utilised instead.

The arrays as discussed above in relation to all of the previous embodiments may be manufactured in a number of different ways. As with conventional CCD arrays, each cell of the array may be manufactured singly and then joined together, or, more preferably, a plurality of cells may be manufactured on a single chip.

In the case of embodiments 3, 4, 5 and 6, the array manufacturing process may be further eased by employing a mask to alter the sizes of the individual CCD cells.

In this way, an array may be manufactured having a plurality of cells, each of which is equal in size to the largest cell of the desired exponential array. A mask may then be placed over the various cells of the array to limit the effective exposed area of each cell such that an array is formed whereby respective cells have an area that varies in an exponential progression.

Use of a mask gives significant costs savings with respect to attempting to manufacture an array each cell of which has a different area.

Alternatively, a graduated filter may be employed so as to vary the quantity of light received by individual cells. In this way a differential quantity of incident light may be applied across the array's face. Such an arrangement may be employed to simulate an array having a plurality of differently sized cells.

In all of the above embodiments, the CCD arrays used for the device according to the present invention may be reject CCD arrays which have a number of non-functioning cells. These arrays will typically have been required for other products such as CCD cameras that necessitate perfect CCD arrays. Thus, it is highly likely that it will be possible to obtain the CCD arrays utilised with the present embodiments at a very low unit cost, thus providing yet further cost savings over the prior art. Indeed, with the first and second embodiments, CCD arrays may be used that have a relatively large number of non-functioning cells. The arrays utilised in connection with embodiments 1 and 2 typically have a large number of cells in their arrays. Thus, even if a seemingly large number of cells are non-functioning, the operation of the light meter will be barely affected.

As mentioned above, the reading circuit means 42 has only been hitherto schematically discussed. In all of the embodiments, the reading circuit means has substantially the same architecture. That architecture is shown schematically in FIG. 8.

Figure 8:
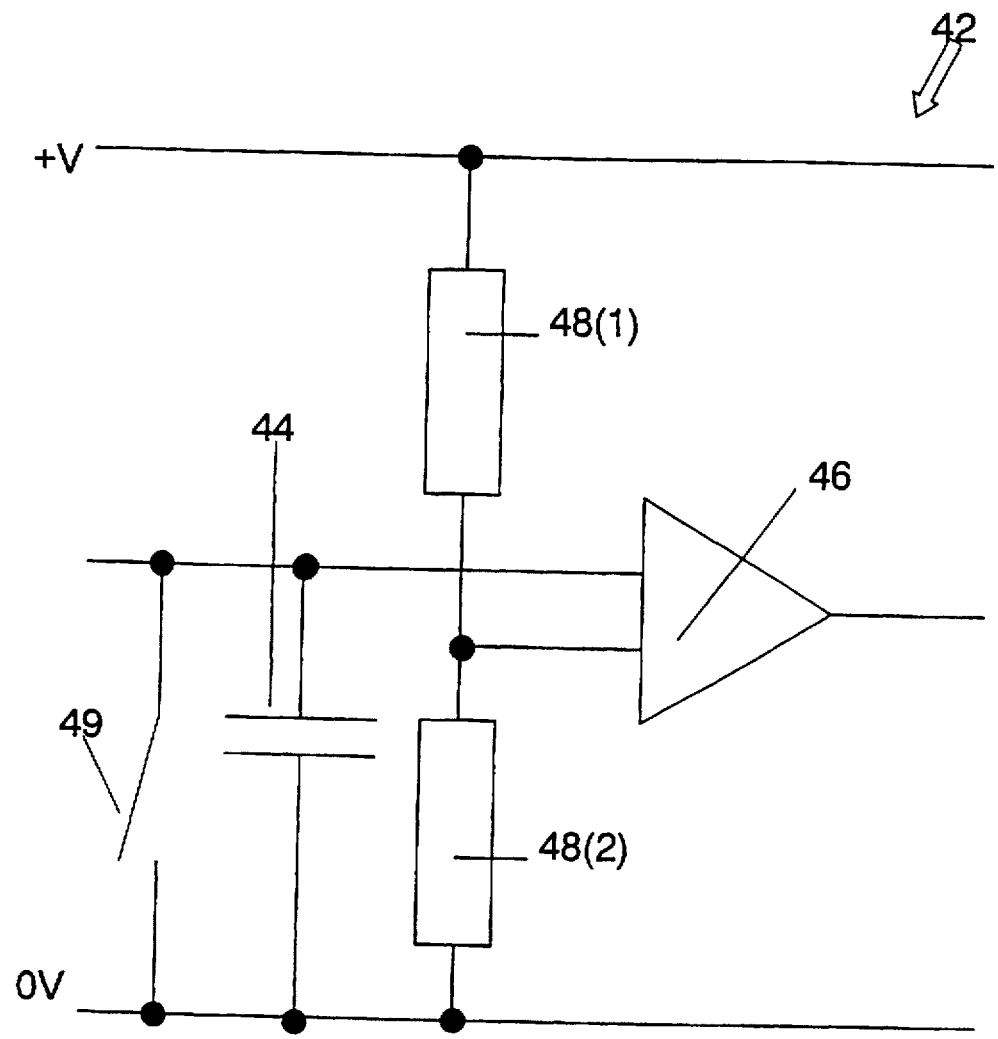
FIG. 8 shows a schematic representation of a reading circuit means.

With reference to FIG. 8, the reading circuit means 42 comprises a capacitor 44, a comparator 46, threshold voltage means 48 which in this case is a pair of resistors 48(1) and 48(2) and a switch 49. The switch 49 is used to discharge the capacitor 44 after a reading has been taken.

There are at least four methods of operation of the reading circuit means 42 for reading data from the CCD arrays according to the above mentioned embodiments.

The first method is suitable for use with embodiments 1, 2, 3, 5 and 6 above. In the first method, the capacitor 44 is first discharged by closing the switch 49. Next the CCD cells are sequentially emptied into the capacitor 44 until the voltage stored by the capacitor 44 exceeds the threshold voltage. For a linear reading, the cells are emptied one at a time (e.g., embodiment 1). For a log reading, the cells may be emptied in exponentially increasing groups such as in embodiment 2. A logarithmic reading may also be obtained by sequentially emptying cells of varying area into the capacitor. Once the threshold is exceeded, a signal is sent from the comparator to logic means (not shown) which has counted the number of cells emptied—as described above. Preferably, the logic means then consults a ROM look-up table to acquire the quantity of incident light. The linear readings obtained by this method may also be converted to log readings by suitably amending the look-up table.

The second read-out method is suitable for use with embodiments 3 and 5. In the second method, no multiplexing is used. The charge stored in the first cell is dumped to the capacitor 44 and then compared to the voltage threshold 48. If the voltage threshold 48 is exceeded, the capacitor 44 is discharged and the next cell is read, and so on until the b'th cell is read and the voltage threshold is no longer exceeded. At that point, the logic means notes the number of the cell immediately above the threshold and looks up the corresponding quantity of light reading in the look-up table stored in ROM.

The third method is suitable for use with the sixth embodiment. The third method is essentially opposite to the second method described above. In the third method charge stored in the first cell is dumped to the capacitor 44 and compared to the voltage threshold 48. If the voltage threshold 48 is not exceeded, the capacitor 44 is cleared and a reading from the second cell is compared to the threshold 48. This process continues until the threshold 48 is first exceeded, at which point the cell number is noted and the corresponding quantity of light is obtained from the look-up table stored in ROM.

The fourth method is suitable for use with the device according to the fourth embodiment. In this method, each cell is individually compared to a threshold voltage and a signal is sent to the positional coder 50 indicating wether the threshold has been exceeded. The positional coder 50 detects the number of the cell at which the threshold is first exceeded. Logic means then refers to the look-up table stored in ROM and acquires the quantity of light corresponding to that cell number.

For case of reference, Table 1 (below) shows which reading methods are suitable for which of the embodiments of the present invention.

TABLE 1

|  | Method 1 | Method 2 | Method 3 | Method 4 |
| --- | --- | --- | --- | --- |
| Embodiment 1 | YES | NO | NO | NO |
| Embodiment 2 | YES | NO | NO | NO |
| Embodiment 3 | YES | YES | NO | NO |
| Embodiment 4 | NO | NO | NO | YES |
| Embodiment 5 | YES | YES | NO | NO |
| Embodiment 6 | YES | NO | YES | NO |

Although the various reading methods have been described in some detail above, numerous other modifications and alterations will be apparent to the skilled man once this disclosure has been read and studied.

For example, the skilled man will appreciate that the exposure time of each cell of the array, or of the array as a whole may be varied so as to:

1. Provide a logarithmic output,
2. Reduce the number of cells required in the array, or
3. Further improve the dynamic range of the meter.

Equation 1 above states that the quantity of incident light is proportional to the exposure time or shutter speed. Thus, we can use this fact to produce a logarithmic meter from a linear array of identically sized cells such as Embodiment 1. In order to achieve a log reading meter, each cell 28(1) to 28(5) of the Embodiment 1 array 28 may be exposed to the light for an exponentially increasing amount of time. Thus, the first cell 28(1) of the array 28 is exposed for one time unit, the second 28(2) for two time units, the third 28(3) for four time units and so on. As the quantity of charge stored in each cell is directly proportional to the amount of time for which the cells are exposed to light, a logarithmic measure of the quantity of incident light is achievable. The data from the individual cells may be summed as in method 1, read individually as in method 3 or each cell of the array may be connected to its own reading circuit, the cells being read in the manner of method 4. Care must be taken to ensure that each cell of the array is large enough so that charges accumulated in later cells having an increased exposure time will not overfill other cells in the array.

In this way, the linear light meter of embodiment 1 may be made to operate as a logarithmic device—thereby enabling a measurement of corresponding aperture areas for a particular quantity of incident light to be taken.

Figure 9:
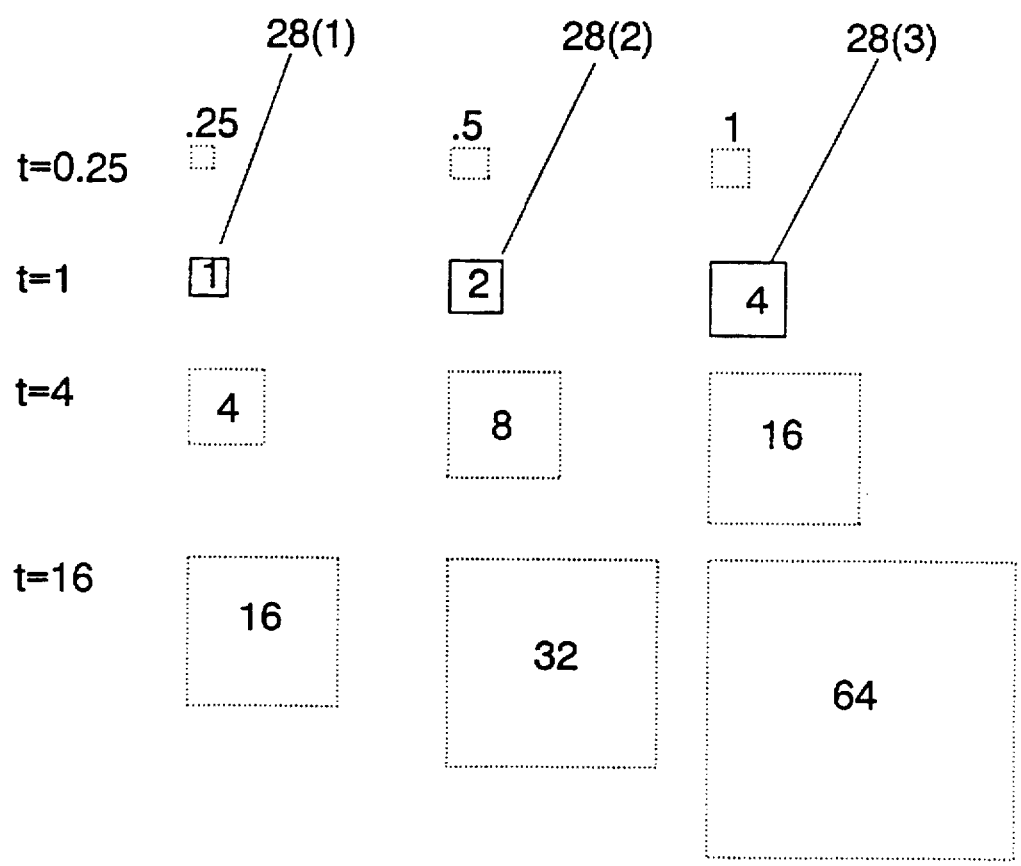
FIG. 9 shows a schematic representation of a light meter according to a seventh embodiment of the present invention.

Operation 2 above enables the size (and hence cost) of the CCD array to be dramatically reduced without losing the sensitivity of the meter. FIG. 9 shows a schematic diagram of an array which has been modified in this fashion. In FIG. 9, an exemplary array 28 of three cells 28(1) to 28(3) is shown. The area of each cell 28(1) to 28(3) is shown within each cell of the array 28. A first cell 28(1) has an area of one unit$^2$, a second 28(2) an area of 2 units$^2$ and a third 28(3) an area of 4 units$^2$. These cells are initially exposed for a time "t" of one unit. At that first exposure, the cells each store a charge that varies in the ratio of 1:2:4. Next the cells are exposed for a time "t" of four units—i.e., for an interval of time equal to the area of the largest cell 28(3) of the array. At this second exposure, the cells each store a charge that varies in the ratio 4:8:16. FIG. 9 shows within each cell the equivalent virtual area of the cells once the exposure time has been increased—this virtual area represents the area of the cells that would have to be provided to store the same quantity of charge if the exposure time was to be kept constant at one unit. Next, the cells are exposed for a time "t" of 16 units and each cell stores a charge that varies in the ratio of 16:32:64. The exposure time may be further increased if desired such that a full range of measurements is available.

Similarly, the exposure time may be decreased so that a decreasing range of readings may be taken. In fact, in operation, it is preferred that the array is provided with a series of relatively large cells and the exposure time is reduced in downward increments. In this way, it is assured that the operator of the meter does not have to stand around for long periods of time to take a reading.

At each exposure iteration, the charge stored in each cell may be either summed or individually compared to the voltage threshold. In this way, it is possible to construct a full range of different cell sizes such that an accurate measurement over the entire dynamic range is possible without having to provide a large number of CCD cells.

Figure 10:
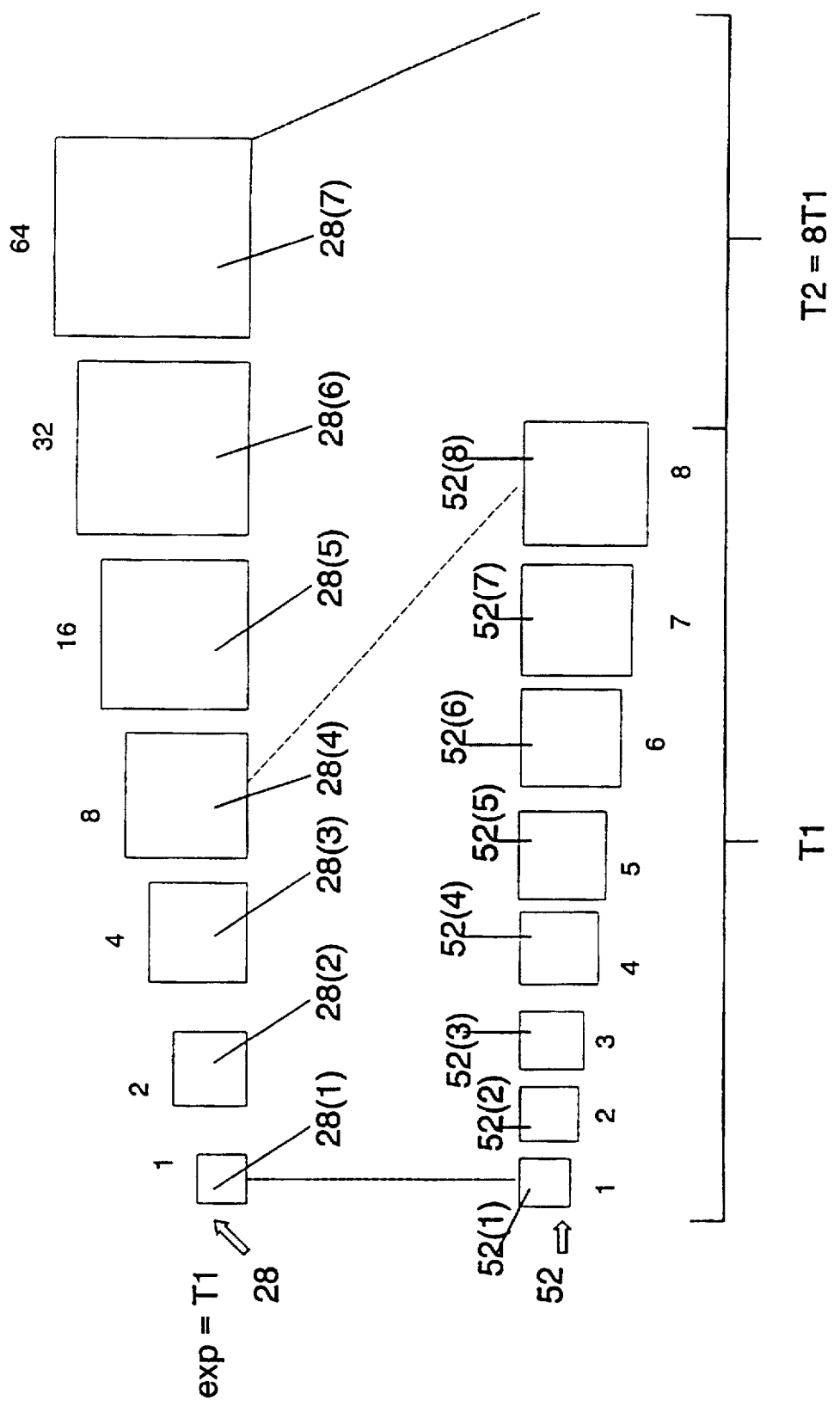
FIG. 10 shows a schematic representation of a light meter according to an eighth embodiment of the present invention.

Operation 3 above enables the accuracy of the array to be yet further improved. FIG. 10 illustrates schematically an array 28 of N cells, the area of each of which varies in an exponential progression—as indexed immediately above each cell of the array 28. Each cell 28(1) to 28(7) of the array therefore has an area that differs by a factor of 2 from the immediately preceding array cell. This factor of 2 corresponds to a measurement of 1 aperture stop i.e. an array of 41 cells corresponds to an aperture measurement of 40 stops.

Using methods 1 or 3 above, a quantity of light reading may be taken that is measured against a threshold voltage $V_{threshold}$. The number of the cell at which that voltage is first exceeded is then recorded and used to generate a quantity of light reading in aperture stops. It will be immediately apparent, however, that with a factor of 2 between successive cell charges, there exists the possibility that a large error may be incorporated into the device. Such a scenario is easy to imagine if one considers the example where cell number X is marginally beneath the threshold, but cell number X+1 is vastly over the threshold. Should the reading be therefore taken at cell number X, X+1 or even X+2? In a linear meter, such a variation would not be critical, but a log meter may increase the variation to a point at which it may be unacceptable.

With reference to FIG. 10, the array 28 is first exposed for a time $T_1$ and a rough quantity of light setting is obtained. Next, a smaller array 52 is exposed for a time $T_2$ that is variable depending on the reading obtained from the larger array 28. The smaller array 52, in this case, covers a range of three apertures stops. The smaller array 52 has a plurality of cells 52(1) to 52(8), in this case 8, which vary in size from a smallest 52(1) to a largest 52(8). The smallest cell 52(1) has an area equal to that of the larger array's first cell 28(1) and the largest cell 52(8) has an area equal to that of the larger array's fourth cell 28(4)—which is three aperture stops from the larger array's first cell 28(1). The small array's intervening cells 52(2) to 52(7) form a linear progression of cell areas—again as indexed immediately below each cell.

From the description provided above with respect to operation 2, it is apparent that by varying the exposure time $T_2$ of the smaller array, the smaller array may be mapped onto cells of the larger array. For example, if the smaller array is exposed for a time $T_2$ equal to $T_1$ the smaller array maps onto cells 1 to 4 of the larger array. If the smaller array is exposed for a time $T_2$ equal to eight times $T_1$, the smaller array maps onto cells 4 to 7 of the larger array and so on.

This may be illustrated if we assume, for example, that exposure of the larger array for time $T_1$—half a second in this case—has resulted in a measurement whereby the seventh cell 28(7) is the first at which the threshold—which is equivalent to a cell area of approximately 34 units$^2$ say—is first exceeded and a rough aperture stop reading may be taken. Next, the smaller array 52 is exposed for a time $T_2$—in this case four seconds (i.e. eight times T1)—to map the smaller array onto 52 cells 28(4) to 28(7) of the larger array 28. The smaller array 52 indicates that cell 52(5) (with an equivalent area of 40 units$^2$) is the first cell which the threshold is exceeded. From this, it is apparent that the nearest cell to the threshold is, in fact, cell 28(6) of the larger array 28 and not cell 28(7) as earlier thought. Thus, a more accurate reading may be taken. This method may also be used to measure fractional aperture stops where such apertures settings are supported by the camera.

Indeed, if the larger array 28 were to increase (or decrease) in area on a log base 2 scale (i.e. on a scale having a variation of one aperture stop between cells), then the smaller array 52 could increase (or decrease) on a log base 1.0728 scale to provide an increment of 1/10 stop between successive cells of the small arrays 52.

As mentioned above, various reading methods may be adopted for each of the embodiments and further variations may be obtained by adjusting the exposure times of the arrays and/or their constituent cells.

It should also be remembered that whilst the embodiments disclosed herein have been discussed by way of a base two logarithmic progression, other logarithmic series may be adopted if preferred. In addition, all the embodiments discussed above may be modified by increasing or decreasing the number of cells in the array. Indeed, it would be possible to provide an array which had only a single cell if so desired. That single cell could be exposed for an exponentially increasing or decreasing amount of time at successive iterations in order to generate a logarithmic quantity of ambient light reading. Alternatively, the cell could be successively exposed and summed for equal exposure times to give a linear quantity of light reading.

Figure 11:
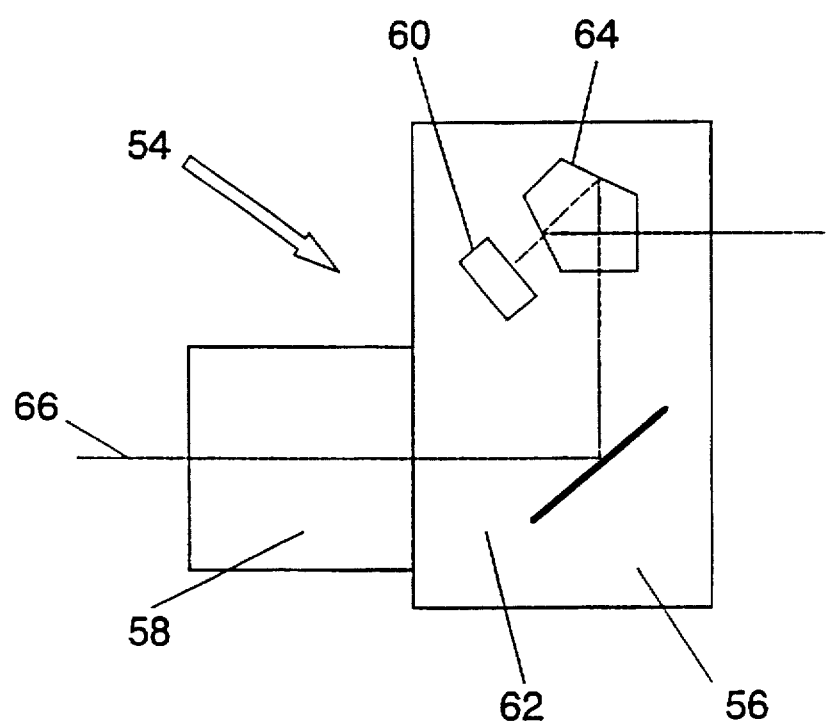
FIG. 11 shows a camera incorporating a light meter according to any of the above mentioned embodiments.

The scope of the present invention also extends to a camera incorporating, either as an "add on" unit, or as an integral part, a light meter as herein described. The camera's logic circuits may be linked to the light meter such that initial exposure settings may be made by way of the camera's body, the light meter adjusting the exposure times to generate an aperture reading as discussed above. Such a camera is shown schematically in FIG. 11. The camera 54 comprises a camera body 56, lens mounting 58 and light meter 60. For an SLR (Single Lens Reflex) Camera, the camera body 56 typically includes a movable mirror 62 and prism 64. The light path through the camera is shown as a dashed line 66 Adjustment of the camera 54 may be engineered to cause corresponding adjustment of the light meter 60. In FIG. 11, the light meter 60 is shown as being in a "through-the-lens" configuration. However, the light meter could be provided as a separate unit.

As an alternative or an addition to all of the above embodiments, the ROM may also be used to generate the number of cells of the array that are to be read at any iteration.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

In addition, it will be realised that any of the appended dependent claims may be dependent from any of the appended independent claims.

I claim:

1. A light meter, comprising:
   a light sensitive charge storage array having a plurality of charge storage cells, each of the charge storage cells having a substantially identical area exposed to incident light; and
   a reading circuit connected to said light sensitive charge storage array for reading charges from an exponentially increasing number of the charge storage cells during each reading operation and for generating from the read charges a light reading indicative of the incident light, wherein said reading circuit collects the charges from the charge storage cells and compares the collected charges to a threshold value to generate said light reading.

2. The light meter according to claim 1, further comprising a logic unit for calculating said light reading according to the following equation:

$$I = k \cdot \frac{V_{threshold}}{B}$$

where I is said light reading, k is a constant, $V_{threshold}$ is said threshold value, and B is the number of reading operations performed by said reading circuit.

3. The light meter according to claim 1, further comprising a look-up table for obtaining said light reading based upon a number of the charge storage cells that have been read.

4. The light meter according to claim 3, further comprising another look-up table for obtaining a number of the charge storage cells to be read during a next reading operation.

5. The light meter according to claim 4, further comprising a memory for storing the look-up tables.

6. The light meter according to claim 1, wherein the charge storage cells are charge coupled device (CCD) cells.

7. The light meter according to claim 1, wherein said reading circuit comprises a switch for resetting said reading circuit, a voltage supply for providing said threshold value, a capacitor for storing the charges from said light sensitive charge storage array, and a comparator for comparing the charges to said threshold value.

8. A light meter, comprising:

a light sensitive charge storage array having a first plurality of charge storage cells, each of the charge storage cells having an area exposed to incident light in an exponential progression; and reading means connected to said light sensitive charge storage array for reading charges from the charge storage cells during each sequential reading operation and for generating from the read charges a light reading indicative of the incident light, wherein said reading means collects the charges from the charge storage cells and compares the collected charges to a threshold value to generate said light reading.

9. The light meter according to claim 8, wherein said reading means conducts an iterative process such that one of the charge storage cells is read at each iteration.

10. The light meter according to claim 9, wherein said reading means sums at each iteration the charges read from the charge storage cells and compares the summed charges to said threshold value.

11. The light meter according to claim 8, wherein said reading means individually compares the charges in each of the charge storage cells to said threshold value.

12. The light meter according to claim 8, wherein said reading means includes a number of reading circuits each connected to the respective charge storage cells for reading the charges therefrom.

13. The light meter according to claim 12, further comprising a logic unit connected to the reading circuits for ascertaining a charge storage cell at which said threshold value is exceeded first.

14. The light meter according to claim 13, wherein said logic unit is a positional coder.

15. The light meter according to claim 8, wherein the charge storage cells are exposed to varying quantities of the incident light using a graduated filter placed over said light sensitive charge storage array.

16. The light meter according to claim 8, wherein said light sensitive charge storage array further comprises another plurality of masked read-out cells, each of the masked read-out cells being connected to a respective charge storage cell and having a substantially identical area equal to a largest area of the charge storage cells.

17. The light meter according to claim 8, further comprising a logic unit for calculating said light reading according to the following equation:

$$I = k \cdot \frac{V_{threshold}}{N}$$

where I is said light reading, k is a constant, $V_{threshold}$ is said threshold value, and N is the number of charge storage cells read by said reading means.

18. The light meter according to claim 8, further comprising a look-up table for obtaining said light reading based upon a number of charge storage cells that have been read.

19. The light meter according to claim 8, wherein said reading means conducts a number of iterations such that said light sensitive charge storage array is exposed to the incident light for a predetermined amount of time at each of the iterations.

20. The light meter according to claim 19, wherein said predetermined amount of time is selectively increased or decreased exponentially at the respective iterations.

21. The light meter according to claim 8, wherein each of the charge storage cells is exposed to the incident light for a different length of time.

22. The light meter according to claim 8, further comprising a second plurality of charge storage cells having respective areas exposed in an increasing progression, said second plurality being comprised of a smaller number of charge storage cells than said first plurality, a first and last cell of said second plurality being substantially identical in their respective exposed areas to a pair of the charge storage cells in said first plurality, wherein said first plurality is exposed for a first predetermined time to obtain an approximate point at which said light reading is generated and said second plurality is exposed for a second predetermined time such that said second plurality is mapped onto said first plurality thereby to more accurately obtain said light reading.

23. The light meter according to claim 22, wherein the respective areas of the charge storage cells in said first plurality increase in a log base 2 progression and the respective areas of the charge storage cells in said second plurality increase in a log base 1.0728 progression.

24. A camera, comprising:

a camera body, a lens mounting, and a light meter including:

a light sensitive charge storage array having a plurality of charge storage cells, each of the charge storage cells having a substantially identical area exposed to incident light; and a reading circuit connected to said light sensitive charge storage array for reading charges from an exponentially increasing number of the charge storage cells during each reading operation and for generating from the read charges a light reading indicative of the incident light, wherein said reading circuit collects the charges from the charge storage cells and compares the collected charges to a threshold value to generate said light reading.

25. A camera, comprising:

a camera body, a lens mounting, and a light meter including:

a light sensitive charge storage array having a first plurality of charge storage cells, each of the charge storage cells having an area exposed to incident light in an exponential progression; and reading means connected to said light sensitive charge storage array for reading charges from the charge storage cells during each sequential reading operation and for generating from the read charges a light reading indicative of the incident light, wherein said reading means collects the charges from the charge storage cells and compares the collected charges to a threshold value to generate said light reading.

26. A method of measuring a quantity of ambient light, comprising the steps of:

exposing a light sensitive charge storage array having a plurality of charge storage cells to the ambient light, each of the charge storage cells having a substantially identical area exposed to the ambient light;

reading charges from an exponentially increasing number of the charge storage cells during each reading operation;

collecting the charges from the charge storage cells;

comparing the collected charges to a threshold value; and generating from the compared charges a light reading indicative of the ambient light.

27. A method of measuring a quantity of ambient light, comprising the steps of:

exposing a light sensitive charge storage array having a first plurality of charge storage cells, each of the charge storage cells having an area exposed to the ambient light in an exponential progression;

reading charges from the charge storage cells during each sequential reading operation;

collecting the read charges from the charge storage cells;

comparing the collected charges to a threshold value; and generating from the compared charges a light reading indicative of the ambient light.

* * * * *